(12) United States Patent
Saito et al.

(10) Patent No.: US 8,259,164 B2
(45) Date of Patent: Sep. 4, 2012

(54) IMAGE DISPLAY APPARATUS

(75) Inventors: Kenichi Saito, Yokohama (JP);
Masakazu Tohara, Kawasaki (JP);
Kazutaka Inoguchi, Kawasaki (JP);
Motomi Tsuyuki, Kawasaki (JP);
Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 12/259,616

(22) Filed: Oct. 28, 2008

(65) Prior Publication Data

US 2009/0115842 A1 May 7, 2009

(30) Foreign Application Priority Data

Nov. 2, 2007 (JP) ................... 2007-286257

(51) Int. Cl.
*H04N 13/04* (2006.01)

(52) U.S. Cl. ................. 348/53; 348/49; 348/51; 348/54

(58) Field of Classification Search .......................... None
See application file for complete search history.

(56) References Cited

U.S. PATENT DOCUMENTS

| | | | |
|---|---|---|---|
| 5,751,494 A | 5/1998 | Takahashi | |
| 5,844,713 A | 12/1998 | Nanba et al. | |
| 5,936,596 A * | 8/1999 | Yoshida et al. | 345/9 |
| 5,945,965 A * | 8/1999 | Inoguchi et al. | 345/6 |
| 6,008,778 A | 12/1999 | Takahashi et al. | |
| 6,177,952 B1 * | 1/2001 | Tabata et al. | 348/47 |
| 6,188,518 B1 * | 2/2001 | Martin | 359/464 |

FOREIGN PATENT DOCUMENTS

| | | |
|---|---|---|
| EP | 945748 A2 | 9/1999 |
| JP | 07-079393 A | 3/1995 |
| JP | 08-240786 A | 9/1996 |
| JP | 10-246865 A | 9/1998 |
| JP | 11-326820 A | 11/1999 |
| JP | 2001-042250 A | 2/2001 |
| JP | 2004-012768 A | 1/2004 |

* cited by examiner

*Primary Examiner* — Mohamed Ibrahim
(74) *Attorney, Agent, or Firm* — Canon USA Inc IP Division (57) ABSTRACT

The image display apparatus includes first and second display elements displaying partial images of a single image, and first and second optical elements each having first, second, and third surfaces. The first and second optical elements respectively allow light fluxes from the first and second display elements to enter the first and second optical elements through the first surface, and then respectively causing the light fluxes to be reflected by the second and third surfaces to emerge from the first and second optical elements through the second surface toward an exit pupil. The second surface of the second optical element has an overlap area facing or contacting the third surface of the first optical element. The second optical element causes the light flux from the second display element to emerge toward the exit pupil through a non-overlap area in the second surface.

7 Claims, 9 Drawing Sheets

IMAGE DISPLAY APPARATUS

BACKGROUND OF THE INVENTION

The present invention relates to an image display apparatus such as a head-mounted display (HMD) capable of presenting a wide viewing angle image by using plural display elements.

It is necessary for an image display apparatus such as an HMD, which enlarges an original image displayed on a display element to present a display image to eyes of a user, to have a wide display viewing angle and a high display resolution in order to increase realistic sensation. On the other hand, it is necessary for such an image display apparatus to be compact and lightweight so as to reduce a sense of discomfort and a sense of fatigue even when it is mounted on the user's head. However, a wider viewing angle increases the size of an optical system of the apparatus. Further, an appropriate-sized display element having a large number of pixels and being capable of employing an enlarging magnification reasonable in optical design is extremely rare.

In contrast thereto, an image display apparatus has been conventionally proposed in which plural small-sized display elements each having a small number of pixels respectively display partial images corresponding to plural viewing angle areas different from one another of a single image to increase the number of pixels for displaying the entire single image and realize a wide display viewing angle.

For example, Japanese Patent No. 3363647 discloses an image display apparatus in which plural mirrors provided for plural display elements respectively reflect image light fluxes from the plural display elements to synthesize them to present a single image formed by connecting plural partial images corresponding to plural viewing angles through a magnifying optical system.

Further, Japanese Patent No. 3524569 discloses an image display apparatus having two display elements and two returning mirrors symmetrically disposed respectively with respect to viewing axis, which presents a single image formed by connecting two partial images.

Moreover, Japanese Patent Laid-Open No. 2001-042250 discloses an image display apparatus in which plural coaxial optical systems with narrow viewing angles are simply arranged such that an optical axis of each coaxial optical system passes through an eye (pupil) of a user.

Further, image display apparatuses which use a prism type optical element having plural optical surfaces to fold an optical path in the optical element and thereby a compact optical system is achieved. For example, Japanese Patent Laid-Open Nos. 11-326820 and 10-246865 disclose an image display apparatus using an optical element having five or three optical surfaces.

The image display apparatus disclosed in Japanese Patent Laid-Open No. 11-326820 uses an optical element on which five optical surfaces are formed by joining two prisms each having three surfaces and being disposed symmetrically with respect to a viewing axis. The optical element internally reflects image light fluxes each corresponding to a half-viewing angle and respectively proceeding from two display elements in regions of the two prisms to guide them to an eye.

Further, the image display apparatus disclosed in Japanese Patent Laid-Open No. 10-246865 guides image light fluxes each corresponding to a half-viewing angle and respectively proceeding from two display elements to an eye via three transmissive and reflective surfaces on the optical element.

The image display apparatuses disclosed in Japanese Patent Nos. 3363647 and 3524569 and Japanese Patent Laid-Open No. 2001-042250 have tendency of increasing the size of the entire optical system because an optical path is folded outside a magnifying optical system or plural optical systems similar to each other are arranged.

Further, the image display apparatuses disclosed in Japanese Patent Laid-Open Nos. 11-326820 and 10-246865 may be attempted to reduce the size of the optical system by increasing space efficiency. However, in the image display apparatus disclosed in Japanese Patent Laid-Open No. 11-326820, a thickness of its optical element is reduced in a viewing axis direction, but on the other hand, it is difficult to reduce the size of the optical element in its width direction orthogonal to the viewing axis direction.

Moreover, in the image display apparatuses disclosed in Japanese Patent Laid-Open Nos. 11-326820 and 10-246865, light emerging from the display element in a direction different from a direction toward an exit pupil which is an original viewing angle direction may be transmitted through an internal reflective surface without fulfilling a total reflection condition to directly reach the eye. Such light is recognized by the user as unnecessary light, which deteriorates a quality of a presented image.

BRIEF SUMMARY OF THE INVENTION

The present invention provides a compact image display apparatus capable of presenting a high-resolution and high-quality image with a wide viewing angle by using plural display elements.

The present invention provides as one aspect thereof an image display apparatus including a first display element and a second display element which respectively display a first partial image and a second partial image of a single image, the first and second partial images corresponding to viewing angle areas different from one another, and a first optical element and a second optical element each of which has a first surface, a second surface, and a third surface, the first and second optical elements respectively allowing light fluxes from the first and second display elements to enter the first and second optical elements through the first surface, and then respectively causing the light fluxes to be reflected by the second and third surfaces to emerge from the first and second optical elements through the second surface toward an exit pupil. The second surface of the second optical element has an overlap area which faces or contacts the third surface of the first optical element, and the second optical element causes the light flux from the second display element to emerge toward the exit pupil through a non-overlap area other than the overlap area in the second surface.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 1:
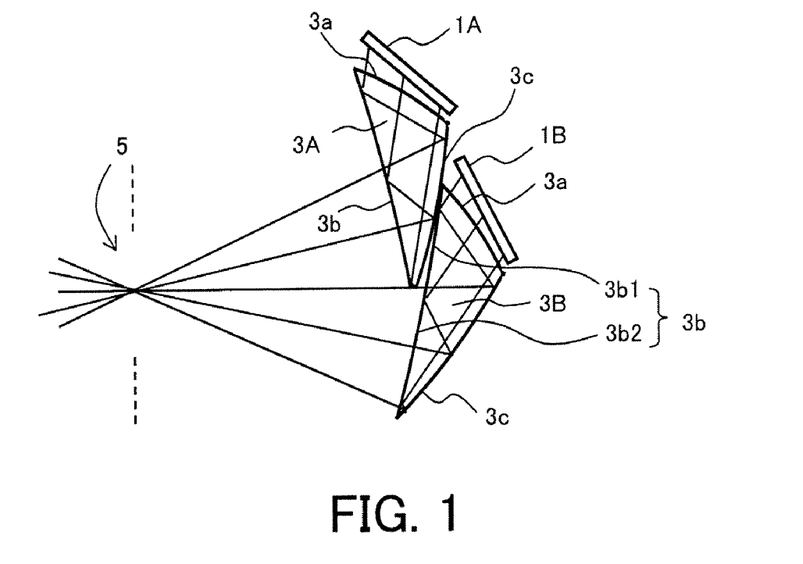
FIG. 1 is a cross sectional view showing the basic configuration of an HMD (facing type) that is an embodiment of the present invention.

FIG. 1 shows the basic configuration of an HMD (image display apparatus) that is Embodiment 1 of the present invention. FIG. 1 shows a first cross section including (that is, parallel to) a direction connecting an eye and an ear of an observer (user) who has mounted the HMD on his/her head.

This HMD is constituted by using plural (two in the present embodiment) display units including a display element 1 and an optical element corresponding to the display element 1.

Figure 2:
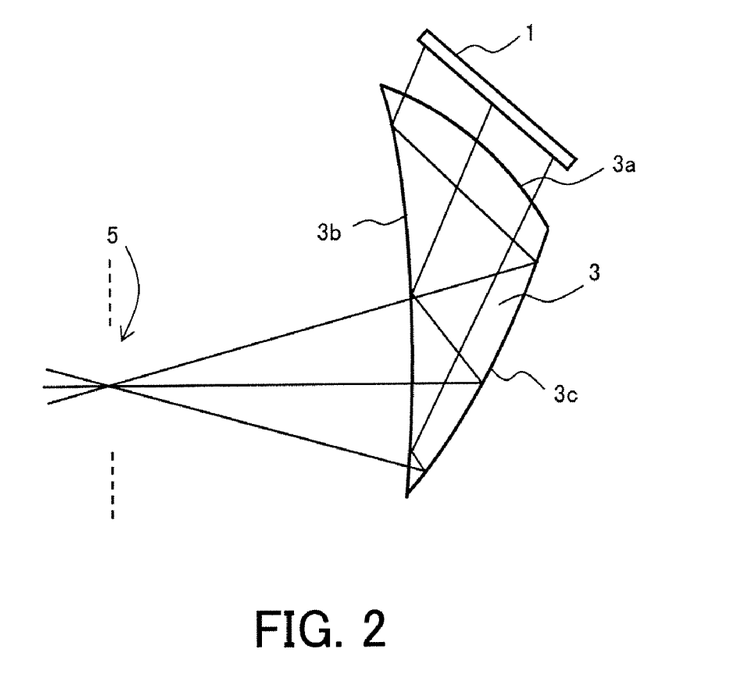
FIG. 2 is a cross sectional view of a display unit configuring part of the HMD of the embodiment.

First, the configuration of each display unit will be described with reference to FIG. 2. The display element 1 is constituted by an LCD or a self-luminous element such as an organic EL. The display element 1 is driven by a driving circuit (not shown) receiving image information (input image) from an image supply apparatus (not shown) such as a personal computer, a DVD player, or a television tuner.

The plural display elements included in the plural display units respectively display partial images of an original image (single image) corresponding to the input image. The partial images correspond to viewing angle areas different from one another. As shown in FIG. 1, two display elements 1A and 1B included in the two display units respectively display halt images corresponding to half-viewing angle areas different from one another.

The optical element 3 is a prism element which has a first surface 3a, a second surface 3b, and a third surface 3c. An inside region of the optical element 3 surrounded by these three surfaces 3a, 3b and 3c is filled with a medium whose refractive index is 1 or more. The optical element 3 enlarges the partial image displayed on the display element 1 to present an enlarged partial image to the eye of the observer (not shown). In detail, the optical element 3 allows a light flux (hereinafter also referred to as an image light flux) from the display element 1 to enter the optical element 3 through the first surface 3a, and then causes the image light flux to be reflected by the second surface 3b and the third surface 3c in this order to emerge from the optical element 3 through the second surface 3b toward an exit pupil 5. An eyeball of the observer is disposed at a position of the exit pupil 5.

Specifically, the image light flux from the display element 1 is transmitted through the first surface 3a to enter the optical element 3, and reaches the second surface 3b at a position facing the exit pupil 5 (eyeball) to be totally reflected thereby. The image light flux totally reflected by the second surface 3b is further reflected by the third surface 3c provided on a side opposite to an exit pupil side with respect to the second surface 3b. A reflective film (metal-deposited film) is formed on an outer surface of the third surface 3c, and the image light flux is reflected by the reflective film (in other words, the image light flux is reflected by the back surface of the third surface 3c).

The image light flux reflected by the third surface 3c proceeds to the second surface 3b, and is transmitted through the second surface 3b to emerge from the optical element 3 toward the exit pupil 5 (eyeball).

The HMD shown in FIG. 1 uses two of such display units (first and second display units). In the optical element (first optical element) 3A of the first display unit, the image light flux that has emerged from the display element (first display element) 1A, proceeded via the first and second surfaces 3a and 3b and then reflected by the third surface 3c is transmitted through part of the second surface 3b to emerge toward the exit pupil 5 (eyeball).

On the other hand, the second surface 3b of the optical element (second optical element) 3B of the second display unit has an overlap area 3b1 closely facing part of the third surface 3c of the optical element 3A of the first display unit and an area 3b2 other than the overlap area. The term "to face" means providing a gap between the overlap area 3b1 and the part of the third surface 3c. The area 3b2 is an area other than the overlap area 3b1 in the second surface 3b, in other words, a non-overlap area which does not closely face the third surface 3c. The overlap area 3b1 and the non-overlap area 3b2 totally reflect the image light flux reaching them from the first surface 3a toward the third surface 3c.

The image light flux that has emerged from the display element (second display element) 1B, proceeded via the first and second surfaces 3a and 3b and then reflected by the third surface 3c is transmitted through the non-overlap area 3b2 in the second surface 3b to emerge toward the exit pupil 5 in common with the optical element 3A.

In the present embodiment, the HMD using the two display elements and the two optical elements will be described. However, the numbers of the display elements and the optical elements may be three or more as in an embodiment which will be described later.

The configuration of the HMD of the present embodiment is representable as follows. That is, the HMD has N (N≧2) display elements and N optical elements corresponding to the N display elements. The N display elements display N partial images of a single image, the partial images corresponding to viewing angle areas different from one another. The N optical elements respectively introduce image light fluxes from the N display elements to the exit pupil (eyeball).

Each of the N optical elements has, in the order from its display element side, a first surface serving as a transmissive surface (entrance surface), a second surface serving as a totally reflective and transmissive surface, and a third surface serving as a reflective surface. A partial area (overlap area) in the second surface of each of (N−1) optical elements faces a third surface of an optical element (hereinafter referred to as an adjacent-viewing-angle optical element) corresponding to a viewing angle area adjacent to a viewing angle area corresponding to the each of the (N−1) optical elements. Then, each of the (N−1) optical elements causes the image light flux to emerge through an area (non-overlap area) which does not face the third surface 3c of the adjacent-viewing-angle optical element in the second surface.

In this way, the present embodiment uses plural display elements and plural optical elements corresponding thereto to cause parts of the plural optical elements to be mutually overlapped in order not to block the image light fluxes in the respective viewing angle areas. This configuration allows the observer to observe a single image which is formed by connecting partial images (enlarged images) formed by the image light fluxes emerging from the plural optical elements, which can realize a compact HMD capable of presenting a high-resolution image at a wide viewing angle.

Figure 3A:
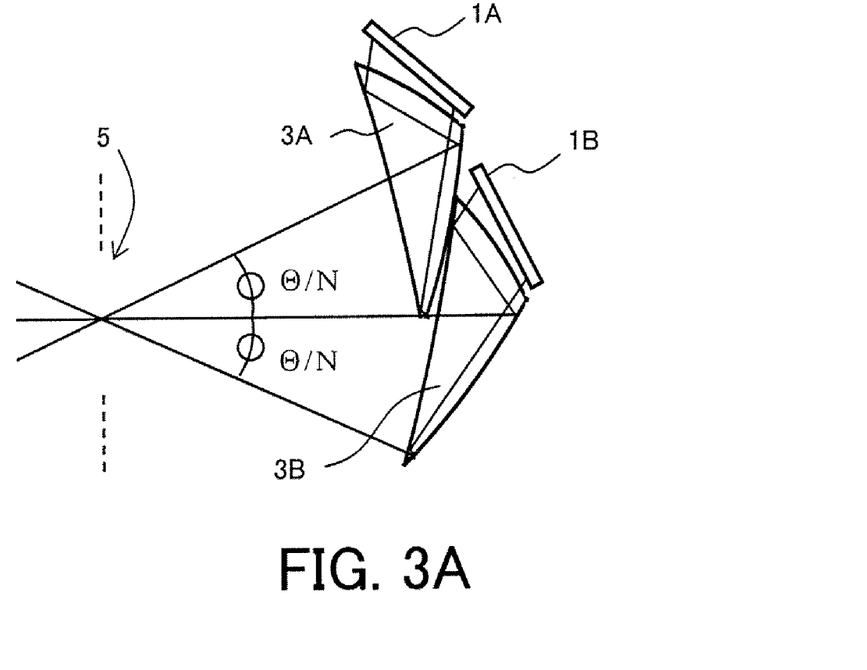
FIG. 3A shows an example of division of a viewing angle in the HMD of the embodiment.
Figure 3B:
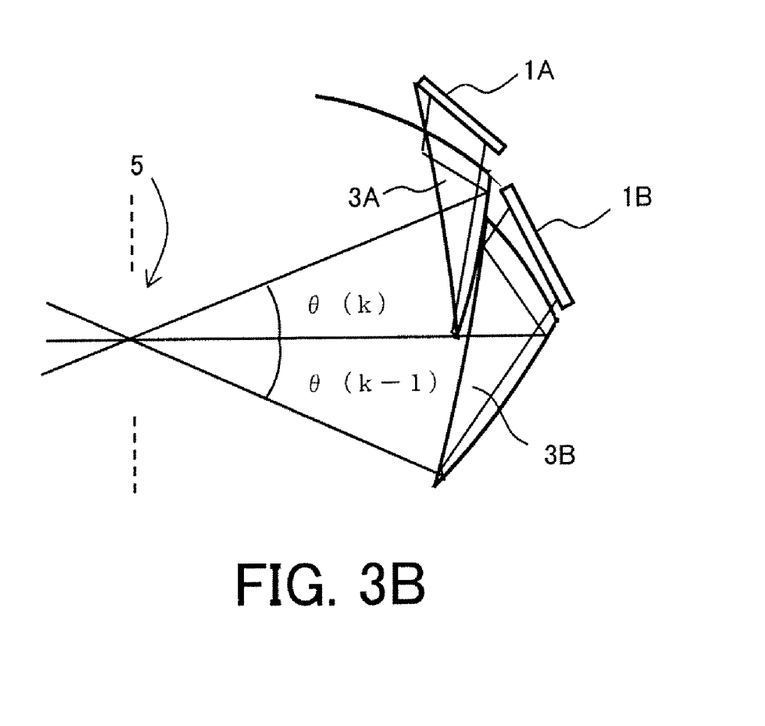
FIG. 3B shows another example of division of a viewing angle in the HMD of the embodiment.

A viewing angle of the entire optical system is defined as Θ in the first cross section including (i.e., parallel to) a direction in which the plural display units (i.e., the display elements and the optical elements) are arranged. A size (angle) θ(k) of a viewing angle area corresponding to each display unit may be θ(k)=Θ/N which is divided equally as shown in FIG. 3A, or may be θ(k)=α(k)·Θ/N so as to depend on a position of each display unit as shown in FIG. 3B. α(k) is a coefficient depending on k, and Σθ(k)=Θ.

Figure 4A:
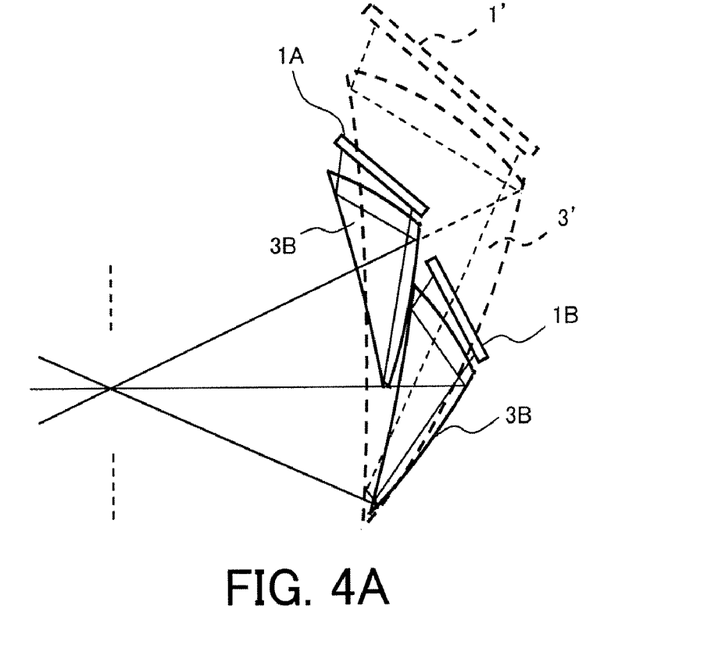
FIG. 4A shows a comparison between the HMD of the embodiment and a conventional HMD.

FIG. 4A shows a size of a conventional HMD (shown by a dotted line) in which one display element 1' and one optical element 3' display the entire viewing angle Θ and a size of the HMD of the present embodiment (shown by a solid line) in which two display units (N=2) display the entire viewing angle Θ by displaying Θ/2 by each display unit. To describe strictly, depending on the sizes of the display elements, the entire thickness (dimension in a horizontal direction in the figure) and the entire width (dimension in a vertical direction in the figure) of the two display units (1A, 1B, 3A, and 3B) in the HMD of the present embodiment is significantly smaller than those in the conventional HMD.

Figure 4B:
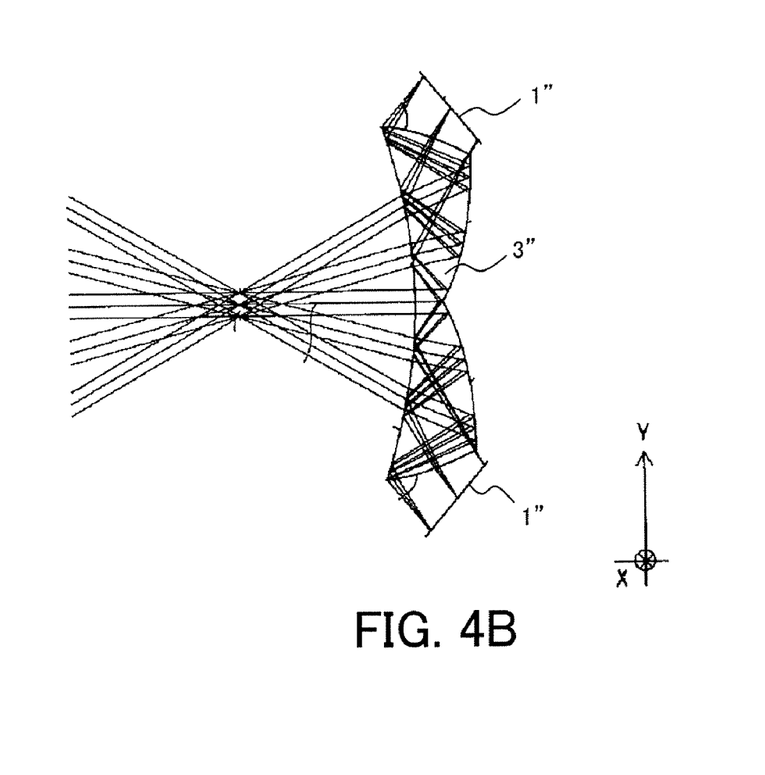
FIG. 4B is a cross sectional view showing the configuration of the conventional HMD.

Further, FIG. 4B shows the configuration disclosed in Japanese Patent Laid-Open No. 11-326820. As compared with the configuration disclosed in Japanese Patent Laid-Open No. 11-326820, the configuration of the present embodiment shown in FIG. 4A in which the overlap area is provided to each of the two display units can suppress the width of the HMD. In the configuration of Japanese Patent Laid-Open No. 11-326820, the display element 1" protrudes from the optical element 3" on both sides thereof in a width direction, which may make it impossible to assure a space between eyes of an observer when two of the above configurations are arranged in the width direction. In contrast thereto, in the configuration of the present embodiment, the display elements are collectively disposed on one side (ear side) in the width direction, which makes it possible to increase the viewing angle by effectively utilizing the space between the eyes.

Further, each optical element used in the present embodiment has the three surfaces, and a cross sectional shape of each optical element is a wedge shape. Therefore, even if the optical elements mutually adjacent are partially overlapped with each other, an increase in thickness in a viewing axis direction is little, which can realize a compact entire configuration while providing a wide viewing angle.

Figure 5:
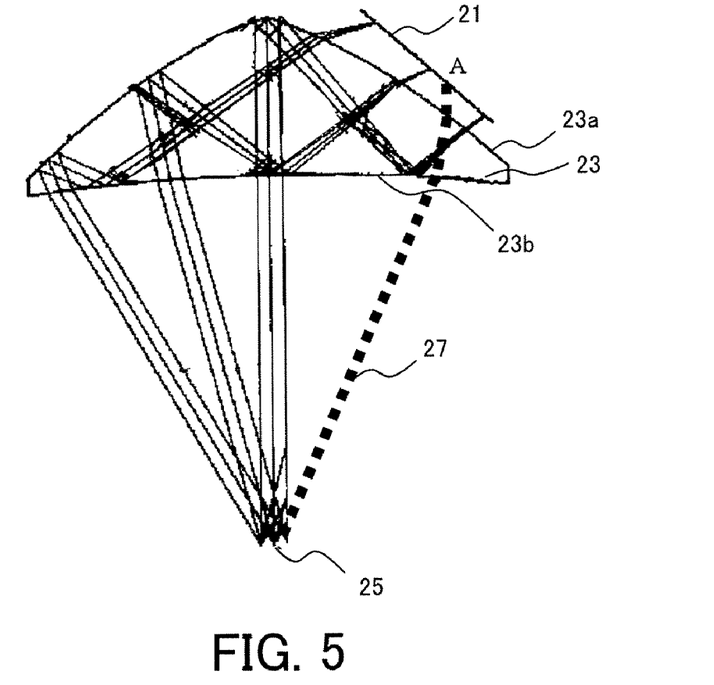
FIG. 5 is a cross sectional view showing an example of unnecessary light in the conventional HMD.

Moreover, FIG. 5 shows an optical path of an image light flux from one display element 21 in the configuration disclosed in Japanese Patent Laid-Open No. 10-246865. The image light flux from the display element 21 enter an optical element 23 through a first surface 23a thereof, and repeats reflections inside the optical element 23 between the first surface 23a and a second surface 23b serving as an emergent surface. Then, the image light flux emerges from the optical element 23 through the second surface 23b toward the exit pupil 25. However, the configuration disclosed in Japanese Patent Laid-Open No. 10-246865 may generate unnecessary light 27 reaching an exit pupil (eyeball) 25 from the display element 21 without proceeding along a predetermined optical path as shown by a solid line in FIG. 5.

Specifically, since an incident angle at which a light ray that has emerged from the display element 21 in a direction other than a direction tracing the predetermined optical path impinges on the second surface 23b is significantly smaller than a critical angle that satisfies a total reflection condition, the light ray (unnecessary light 27) is transmitted through the second surface 23b to reach the exit pupil 25. This is the same in the configuration disclosed in Japanese Patent Laid-Open No. 11-326820. Therefore, the configuration requires extra components such as a filter for limiting an emergent angle of the image light flux from the display element 21.

Figure 6:
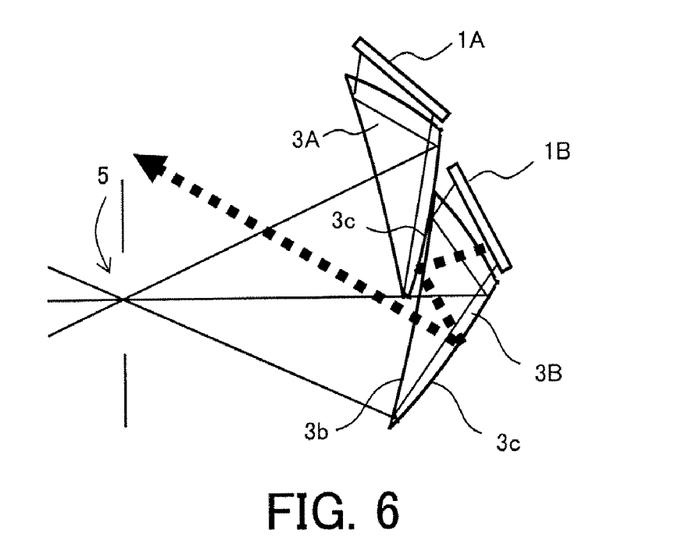
FIG. 6 is a cross sectional view showing an example of unnecessary light in the HMD of the embodiment.

In contrast thereto, in the configuration in the present embodiment, as shown in FIG. 6, unnecessary light (shown by a dotted line in the figure) other than the image light flux tracing the predetermined optical path in the optical element 3B to reach the exit pupil 5 is blocked to reach the exit pupil 5 due to reflection on the third surface 3c of the optical element 3A adjacent to the optical element 3B. That is, the third surface 3c of the optical element 3A has a roll as a stop for the image light flux passing through the optical element 3B. Moreover, the unnecessary light reflected by the third surface 3c of the optical element 3A is reflected by the third surface 3c of the optical element 3B to emerge through the second surface 3b in a direction different from the exit pupil 5. Therefore, even if the configuration does not have extra components such as a filter for limiting an emergent angle of the image light flux from the display element 1B, the unnecessary light is invisible.

In the present embodiment, when a viewing angle area corresponding to each display unit is set to θ(k)=Θ/N, optical units having a same shape can be used for respective display units. In particular, in a case in which the optical elements are molded, one type of mold is sufficient for them, which can contribute to significant reduction in cost.

The overlap area in the second surface of each of the (N−1) optical elements may be made to tightly contact the third surface of the adjacent-viewing-angle optical element to join (bond) these optical elements. In this case as well, each of the (N−1) optical elements causes the image light flux to emerge through the non-overlap area in the second surface, the non-overlap area not facing the third surface of the adjacent-viewing-angle optical element. Thereby, further miniaturization of the HMD can be achieved.

Figure 7:
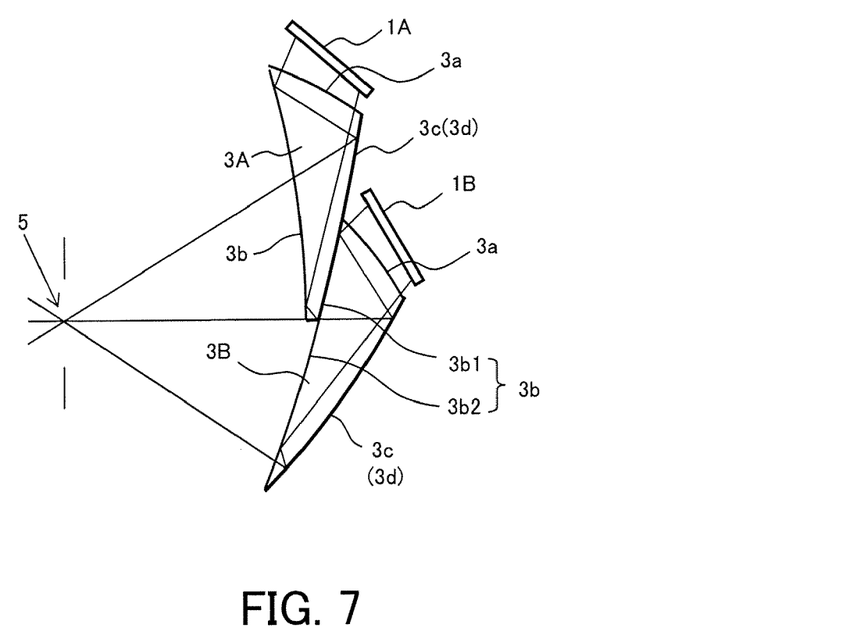
FIG. 7 is a cross sectional view showing the basic configuration of an HMD (contact type) that is another embodiment of the present invention.

FIG. 7 shows a configuration example of the above "contact" type. In the optical element 3A, the image light flux reflected by the third surface 3c is transmitted through part of the second surface 3b to emerge from the optical element 3A toward the exit pupil 5.

On the other hand, the second surface 3b of the optical element 3B has the overlap area 3b1 tightly contacting part of the third surface 3c of the optical element 3A via a reflective film (metal-deposited film) 3*d*, and the non-overlap area 3*b*2 which is an area other than the overlap area 3*b*1. The non-overlap area 3*b*2 is an area which does not contact the third surface 3*c* of the optical element 3A.

In the present embodiment, the reflective film 3*d* is formed on an outer surface of the third surface 3*c* of the optical element 3A in the same way as the third surface 3*c* of the optical element 3B. The non-overlap area 3*b*2 internally totally reflects the image light flux reaching from the first surface 3*a* of the optical element 3B toward the third surface 3*c* thereof. Further, the overlap area 3*b*1 reflects by the reflective film 3*d* the image light flux reaching from the first surface 3*a* toward the third surface 3*c*. The reflection on the reflective film 3*d* is reflection on the third surface 3*c* of the optical element 3A in reality. However, since the reflection can be said back-surface reflection on the overlap area 3*b*1 as well, the reflection is regarded as reflection on the second surface 3*b* of the optical element 3B in this embodiment. The image light flux reflected by the third surface 3*c* is transmitted through the non-overlap area 3*b*2 in the second surface 3*b* toward the exit pupil 5.

Note that, in this "contact" type as well, the numbers of the display elements and optical elements may be three or more as in an embodiment which will be described later.

Such a "contact" type as well uses plural display elements and plural optical elements corresponding thereto to cause parts of the plural optical elements to be mutually overlapped in order not to block the image light flux in each viewing angle area. This configuration allows the observer to observe a single image which is formed by connecting partial images (enlarged images) formed by the image light fluxes emerging from the plural optical elements, which can realize a compact HMD capable of presenting a high-resolution image at a wide viewing angle.

Additionally, since the display units have no gap therebetween, the entire thickness of the HMD can be made smaller as compared with the "facing" type shown in FIG. 1. Further, such a "contact" type does not need, in contrast to the "facing" type, a configuration for setting distances between the optical elements, i.e., relative positional relationships of the optical elements with a high accuracy or for maintaining the relative positional relationships of the optical elements against deterioration with age or impact. Therefore, the configuration of the HMD including a chassis holding the optical elements can be simplified.

Moreover, the respective surfaces (the third surface 3*c* of the optical element 3A and the second surface 3*b* of the optical element 3B) including the tight contact/joint areas serving as the overlap areas can be formed as a single continuous curved surface. This can provide continuity to optical characteristics of boundaries of the viewing angle areas, thereby further improving image quality.

As described above, in the HMD in the present embodiment, the plural optical elements are arranged in the direction connecting the eye and ear (in a horizontal direction) when the HMD is mounted on the head of the observer. Further, an optical element (optical element 3A in FIGS. 1 and 7) whose second surface 3*b* is not adjacent to other optical elements is disposed closer to the ear than the other optical elements.

HMDs are generally required to have a wider viewing angle in the horizontal direction as compared with the vertical direction. Therefore, the configuration in which the plural optical elements are arranged in the horizontal direction when the HMD is mounted on the head can have a wider viewing angle in the horizontal direction.

Figure 8:
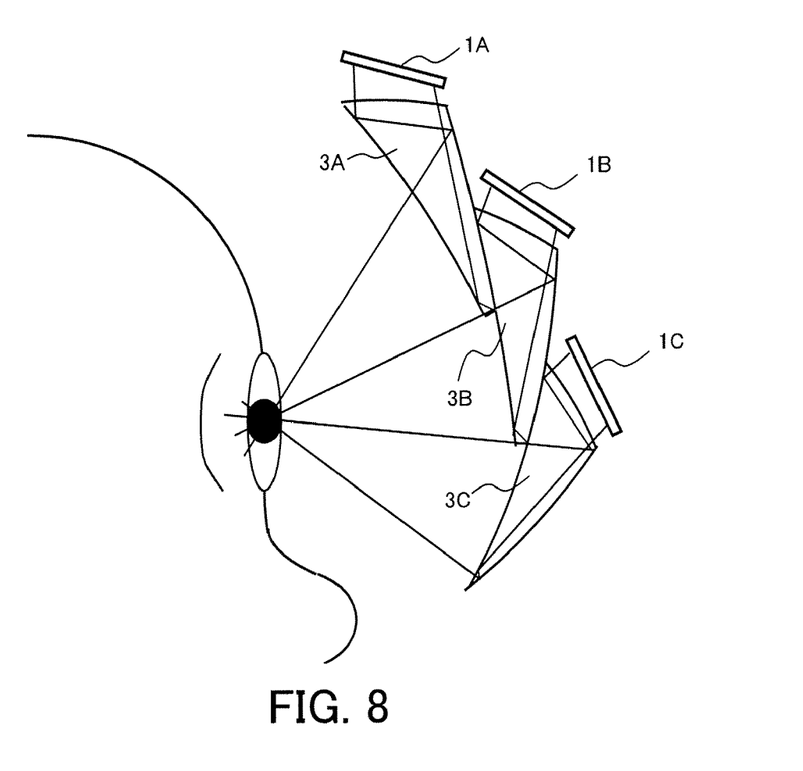
FIG. 8 is a cross sectional view showing the basic configuration of an HMD (contact type) that is yet another embodiment of the present invention.

Further, FIG. 8 as a plane view of the first cross section shows the configuration of the HMD using three display elements 1A to 1C and three optical elements 3A to 3C. In this configuration, the optical element 3A and the optical element 3B adjacent to each other have a relationship as the first optical element and the second optical element. The optical element 3B and the optical element 3C adjacent to each other have the relationship as the first optical element and the second optical element. Such a relationship is the same in a case where four or more optical elements are used.

As understood from FIG. 8 as well, when the optical elements 3A to 3C have a wedge shape with three surfaces, the second surface 3*b* of the optical element 3C which is further away than the optical element 3B from the optical element 3A whose second surface 3*b* is not adjacent to the other optical elements comes closer to a face of the observer. Accordingly, in the present embodiment, the optical element 3C furthest away from the optical element 3A is disposed closer to a center (nose) of the face and the optical element 3A is disposed closer to the ear. This arrangement allows the entire shape of the optical elements 3A to 3C to have a shape along the face. Further, such an arrangement is suitable for drawing a harness (wiring) connected to the display elements 1A to 1C and light sources to illuminate the display elements 1A to 1C outward the HMD.

Description will be made of a total reflection condition which the second surface 3*b* of the optical element 3B should satisfy for the image light flux reaching from the first surface 3*a* in the "facing" type shown in FIG. 1 and the "contact" type shown in FIG. 7.

Figure 9A:
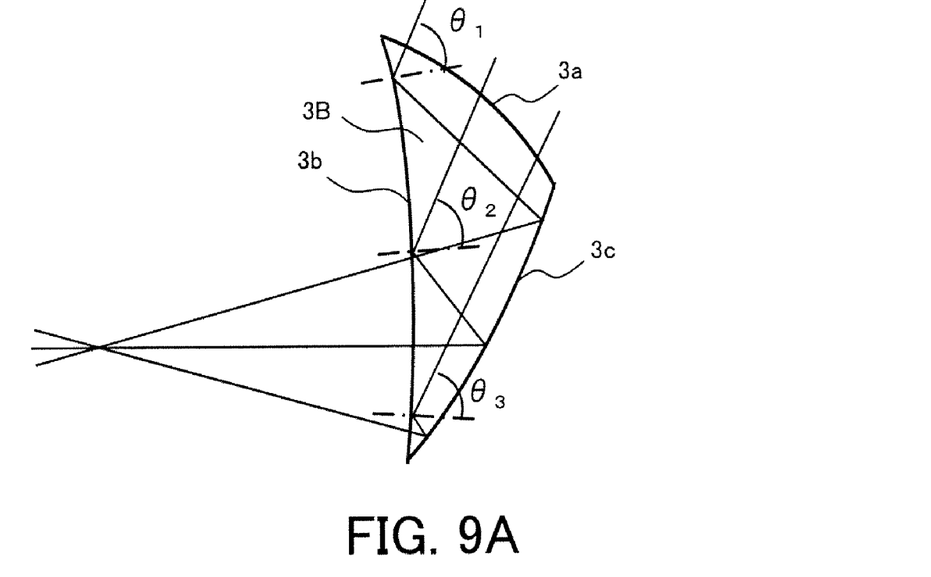
FIG. 9A is an explanatory diagram of total reflection in the HMD (facing type) of the present invention.

First, the total reflection condition for the "facing" type will be described. In order to obtain a high reflectance without providing a reflective film at the second surface 3*b* of the optical element 3B disposed so as to face the third surface 3*c* of the optical element 3A, as shown in FIG. 9A, it is necessary for rays for the entire viewing angle (hereinafter referred to as entire viewing angle rays) proceeding toward the second surface 3*b* from the first surface 3*a* to satisfy the total reflection condition for the entire second surface 3*b*.

The total reflection condition is expressed by:

$$\sin \theta k > n0/n1 \qquad (1).$$

Where θk (k=1, 2, and 3) denotes an incident angle to the second surface 3*b* of the entire viewing angle rays, n0 denotes a refractive index of air, and n1 denotes a refractive index of a material of the optical element 3B. Rays which do not satisfy the total reflection condition is transmitted through the second surface 3*b* to emerge from the optical element 3B.

Figure 9B:
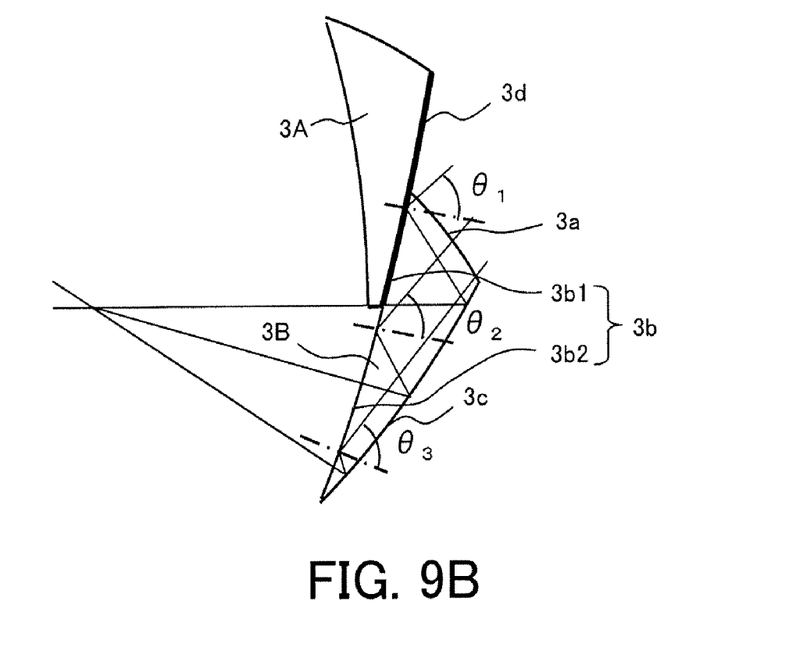
FIG. 9B is an explanatory diagram of back-surface reflection and total reflection in the HMD (contact type) of the present invention.

Next, the total reflection condition for the "contact" type will be described. Since the reflection on the overlap area (tight contact/joint area) 3*b*1 in the second surface 3*b* of the optical element 3B is reflection by the reflective film 3*d*, there is no need for rays reaching the overlap area 3*b*1 of the entire viewing angle rays from the first surface 3*a* to satisfy the total reflection condition for the second surface 3*b*. Accordingly, only rays reaching the non-overlap area 3*b*2 in the second surface 3*b* should satisfy the total reflection condition for the second surface 3*b*. In FIG. 9B, referring to three viewing angle rays as examples, it is necessary for viewing angle rays of incident angles θ2 and θ3 to satisfy the expression (1). However, a viewing angle ray of an incident angle θ1 may satisfy the following condition:

$$\sin \theta 1 < n0/n1.$$

As described above, the use of the reflective film 3*d* relaxes the restriction on the incident angles of rays from the first surface 3*a* to the second surface 3*b* in the overlap area (tight contact/joint area) 3*b*1. This increases the design freedom of the shape of the optical element including a curved surface shape of the second surface 3b. Specifically, an angle formed by the second surface 3b and the third surface 3c in the optical element 3B can be made smaller, which can miniaturize the optical element 3B, i.e., the HMD.

However, as described above, even in the "contact" type, the rays reaching the non-overlap area 3b2 have to satisfy the total reflection condition. Accordingly, it is necessary for all hit points on the second surface 3b of rays whose incident angles are greater than a critical angle θC (=n0/n1) to be present in the non-overlap area 3b2.

Note that, in the "contact" type, the entire viewing angle rays from the first surface 3a may reach the second surface 3b at incident angles satisfying the total reflection condition for the second surface 3b (that is, incident angles satisfying the total reflection condition when the second surface 3b contacts air as in the "contact" type).

Further, for the second surface 3b of the optical element 3A which does not overlap with the other optical element, it is necessary for the entire viewing angle rays reaching the entire second surface 3b to satisfy the total reflection condition.

However, if the reflective film 3d is formed on part of the second surface 3b of the optical element 3A, there is no need in the optical element 3A for rays reaching the reflective film 3d of the entire viewing angle rays from the first surface 3a to satisfy the total reflection condition for the second surface 3a. Thereby, the design freedom can be increased.

Moreover, in the present embodiment, in the optical element 3A, a leading end of a portion overlapping with the optical element 3B is formed as follows.

In normal prisms, a leading end portion on which a second surface and a third surface intersect with each other is formed into an acute-angled and pointed shape. It is not preferable to fully use such a leading end portion as an optically effective area. This is because that such a leading end portion has an uneven refractive index distribution in many cases, which makes it difficult to secure accuracy of shape. Further, since the second surface 3b of the optical element 3A and the second surface 3b of the optical element 3B are not formed into continuous functional curved surfaces, rays forming the boundary between the partial images are distorted, which may deteriorate image quality.

Figure 10:
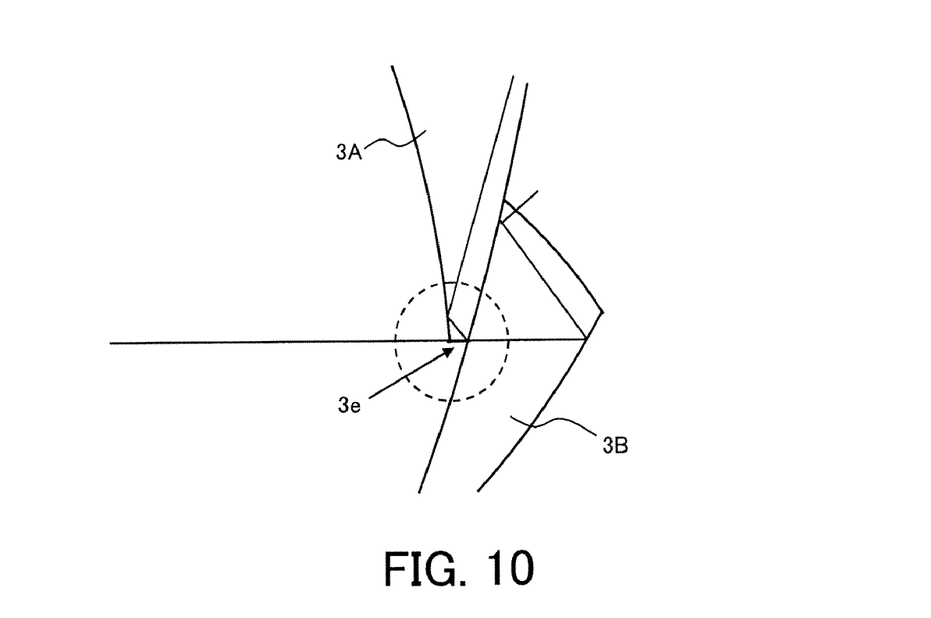
FIG. 10 is a partial enlarged view of an optical element in the HMD of the present invention.

In the present embodiment, as shown in a portion surrounded by a dotted line in FIG. 10, a leading end 3e of a portion in the optical element 3A overlapping with the optical element 3B is formed into a shape along a principal ray surface forming a boundary between partial images which correspond to the optical elements 3A and 3B and are adjacent to each other. The principal ray surface is a surface on which rays passing through a center of a pupil of the eyeball of the observer (a center of the exit pupil 5) or a rotation center of the eyeball and forming the boundary between the partial images adjacent to each other pass. The above-described shape of the leading end 3e of the optical element 3A eliminates an influence on rays emerging from the optical element 3B, which makes it possible to display an image (single image) formed by the mutually adjacent partial images which are smoothly connected with each other.

Further, in the present embodiment, the cross section shown in FIGS. 1 and 7 parallel to the direction in which the display elements 1A and 1B are arranged is defined as the first cross section. Each of the optical elements 3A and 3B has the following relationship between its enlarging magnification in the first cross section and its enlarging magnification in the second cross section orthogonal to the first cross section. In the optical elements 3A and 3B, the first cross section is also referred to as a meridional cross section (cross section parallel to a plane including a reference ray passing thorough a center of the display element and the center of the exit pupil of the optical element). Further, the second cross section is also referred to as a sagittal cross section.

In a system in which plural display elements and plural optical elements are arranged in a certain direction and partial images are connected with each other in the certain direction, a viewing angle increases only in the certain direction, but does not increase in a direction orthogonal to the certain direction. This results in display of an image with an aspect ratio whose balance in the vertical and horizontal directions is undesirable. For example, in a case in which two display elements with an aspect ratio of 4:3 (1.33:1) are arranged in the certain direction, an aspect ratio of a displayed image (image to be observed) is 1.5:1. In a case in which three of the same display elements are arranged, the aspect ratio of the displayed image is 2.25:1. Further, in a case in which four of the same display elements are arranged, the aspect ratio of the displayed image is 3:1.

Therefore, in the present embodiment, in each of the optical elements 3A and 3B, the enlarging magnification in the first cross section parallel to the direction in which the plural display elements 1A and 1B are arranged is set to be smaller than the enlarging magnification in the second cross section orthogonal to the first cross section. This setting can reduce the viewing angle in a direction of the meridional cross section (hereinafter referred to as a meridional cross section direction) and the dimension of the optical element in the same direction. Further, the setting also can increase the viewing angle in a direction of the sagittal cross section (hereinafter referred to as a sagittal cross section direction) in order to secure image performance in the entire viewing angle. The above-described setting for the enlarging magnifications makes the viewing angle in the meridional cross section direction smaller than that in a case in which a same enlarging magnification is set in the meridional cross section and the sagittal cross section. However, the above-described setting can increase the viewing angle in the sagittal cross section direction. Therefore, a desirable aspect ratio can be provided to a displayed image (image to be observed) formed by plural partial images connected with each other.

Figure 11:
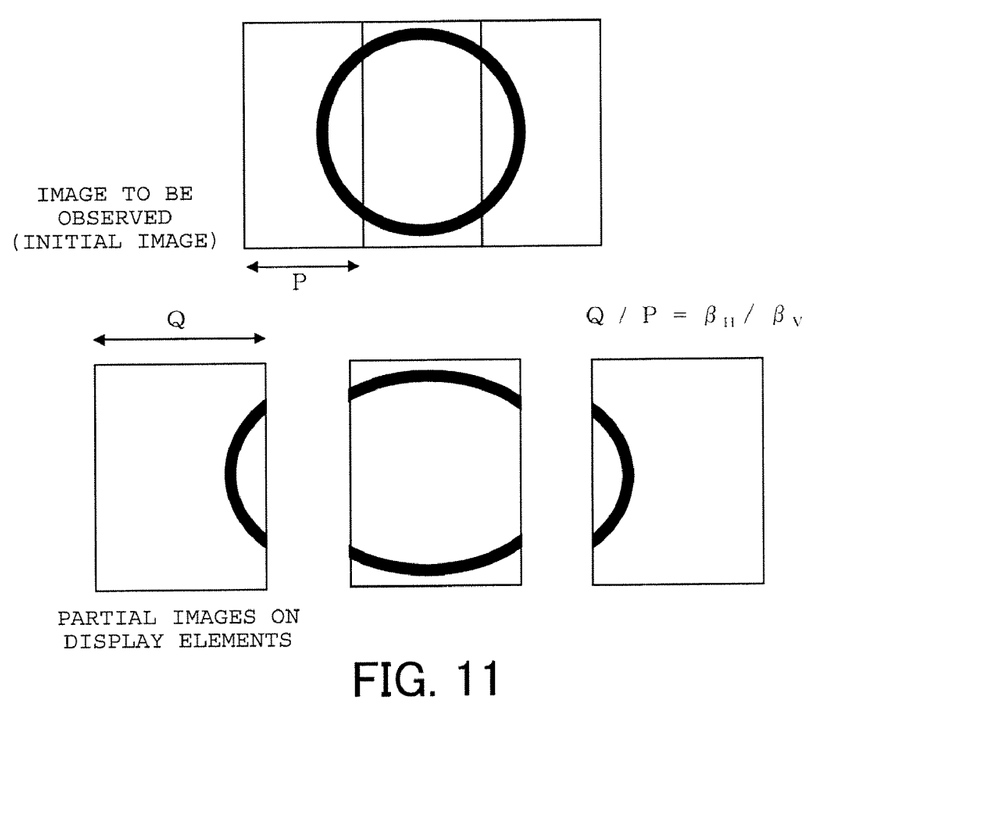
FIG. 11 shows a relationship between partial images and a display image (an image to be observed) in the HMD of the present invention.

In this case, the enlarging magnifications in the meridional cross section and the sagittal cross section are different from each other, it is necessary for a partial image displayed on each display element to be, as shown in FIG. 11, an image (with a width of Q) formed by multiplying an initial image (with a width of P) by:

$$\beta H/\beta V \quad (2)$$

to be stretched in the meridional cross section direction (in the horizontal direction in the figure). βV denotes the enlarging magnification in the meridional cross section, and βH denotes enlarging magnification in the sagittal cross section.

For example, it is assumed that, in a case where display elements with a diagonal size of 1 inch and an aspect ratio of 4:3 are used and optical elements are designed so as to keep the aspect ratio of 4:3, a maximum enlarging magnification at which appropriate image performance can be obtained in the entire viewing angle is 10. In contrast thereto, when the enlarging magnification in a short side direction of the display element (that is, in the meridional cross section direction) is 8, and the enlarging magnification in a long side direction of the display element (that is, in the sagittal cross section direction) is 12, the aspect ratio of the image to be observed corresponding to one partial image is 2:1. Then, the final aspect ratio of the entire image to be observed in a case in which two partial images are arranged (connected with each other) in the meridional cross section direction is 1:1. In a case in which three partial images are arranged in the same direction, the final aspect ratio thereof is 1.5:1. Moreover, in a case in which four partial images are arranged in the same direction, the final aspect ratio thereof is 2:1. In this way, the above-described setting for the enlarging magnifications can provide an image to be observed with a favorable aspect ratio.

Figure 12:
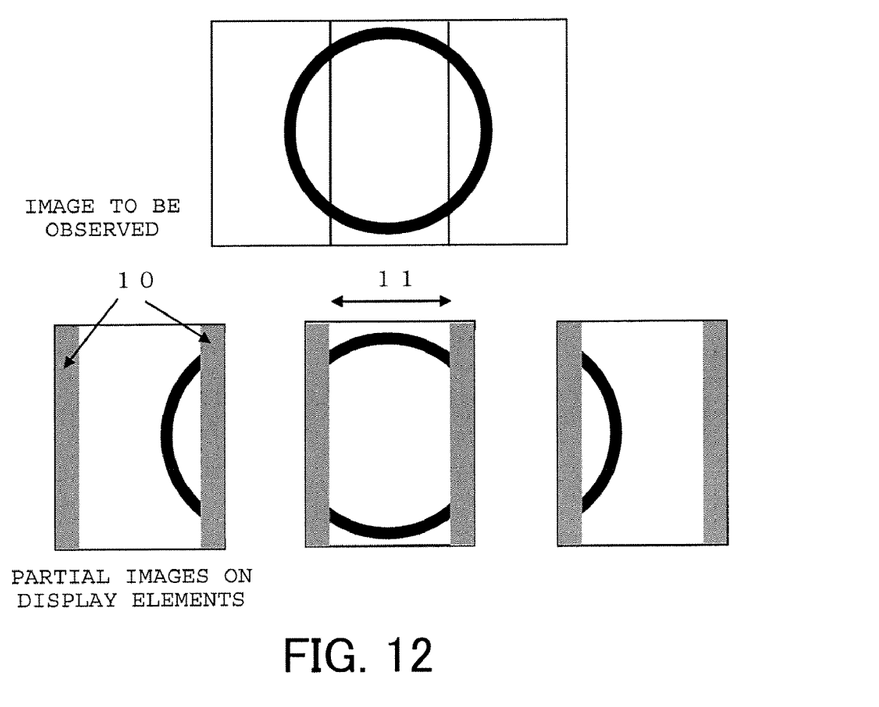
FIG. 12 shows another relationship between partial images and a display image (an image to be observed) in the HMD of the present invention.

Further, in place of the setting of the enlarging magnifications, as shown in FIG. 12, non-display areas 10 which do not display a partial image 11 thereon may be provided to at least one end (one end or both ends) in the meridional cross section direction of each display element. The non-display areas 10 can provide an image to be observed with a favorable aspect ratio while making the enlarging magnifications of the optical element in the meridional and sagittal cross section directions equal to each other.

For example, it is assumed that, in a case where display elements with a diagonal size of 1 inch and an aspect ratio of 4:3 are used and optical elements are designed so as to keep the aspect ratio of 4:3, maximum viewing angles in the sagittal and meridional cross section directions at which appropriate image performance can be obtained in the entire viewing angle is 52 degrees and 39 degrees, respectively. In contrast thereto, assuming that an actual display area on which the partial image 11 is displayed in the display element in the meridional cross section direction is up to 90% of an effective display area of the display element, 35 degrees is sufficient as the viewing angle in the meridional cross section direction, which enables the viewing angle in the sagittal cross section direction to be ensured up to 57 degrees.

In this case, the aspect ratio of one partial image (and an image to be observed corresponding thereto) is 1.63:1. In a case where two of such partial images are arranged in the meridional cross section direction, the final aspect ratio of the entire image to be observed is 1.23:1, and in a case where three of such partial images are arranged in the same direction, the final aspect ratio of the entire image to be observed is 1.84:1. Moreover, in a case where four of such partial images are arranged, the final aspect ratio of the entire image to be observed is 2.46:1. In this way, the above-described setting for the non-display areas 10 can provide an image to be observed with a favorable aspect ratio.

However, employing this system needs to dispose the plural display units such that the partial images actually displayed on the respective display elements can be observed as mutually adjacent images.

The description was made of the case where the plural display elements and the plural optical elements are arranged in the first cross section direction. However, those may be arranged in the second cross section direction.

Figure 13:
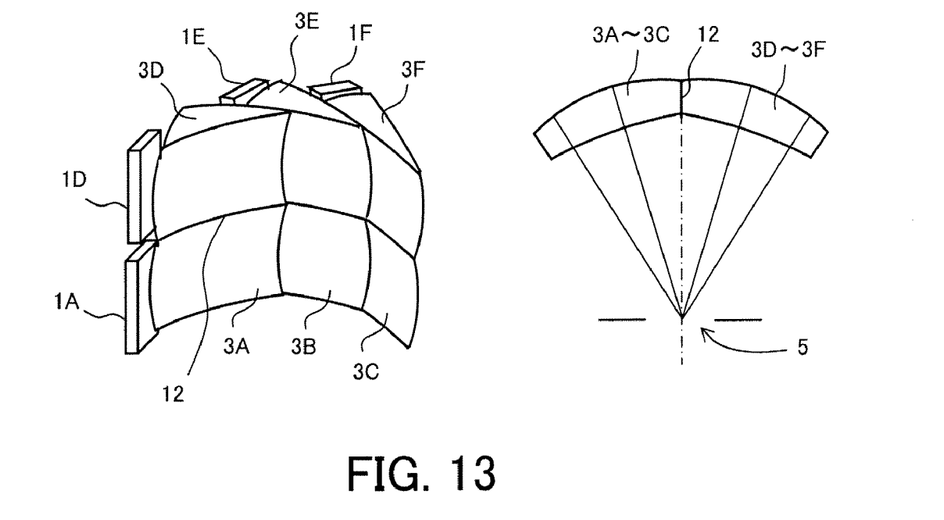
FIG. 13 is a perspective view showing the basic configuration of an HMD that is still yet another embodiment of the present invention.

In detail, as shown in the drawing on the left side of FIG. 13, an assembly constituted by three display elements 1A to 1C (however, the display elements 1B and 1C are not shown) and three optical elements 3A to 3C which are arranged in the first cross section direction is first manufactured. Further, in the same way, an assembly constituted by three display elements 1D to 1F and three optical elements 3D to 3F which are arranged in the first cross section direction is manufactured. Then, these two assemblies are joined to each other in the second cross section direction. This can increase viewing angles in the first and second directions by using six partial images combined two-dimensionally in those directions.

A joint surface 12 between the two assemblies is preferably made to be a flat surface as shown on the right side of FIG. 13. Further, an extended line of the joint surface 12 is preferably set so as to pass through the center of the exit pupil 5 or the rotation center of the eyeball of the observer. This can display the six partial images smoothly connected with each other such that their boundaries are invisible.

Further, when each optical element has distortion, it is preferable to perform electrical correction for canceling the distortion onto the partial image displayed on each display element. As a result, although each display element displays a distorted partial image thereon, a favorable image with little distortion can be observed through the optical element. Further, such correction can more smoothly connect the boundary between mutually adjacent partial images.

In this case, when the respective optical elements have a same shape, partial images distorted in a same characteristic may be displayed on all display elements. Further, when the optical elements have shapes different from one another, partial images distorted according to distortion characteristics of the respective optical elements corresponding to the respective display elements may be displayed on the display elements.

Further, when a light use efficiency distribution according to the viewing angle exists in each optical element, it is preferable to perform electrical correction onto the partial image displayed on each display element so as to reduce variations in brightness and color of the boundary between mutually adjacent partial images.

Hereinafter, more detailed embodiments (numeric examples) will be described.

Figure 14:
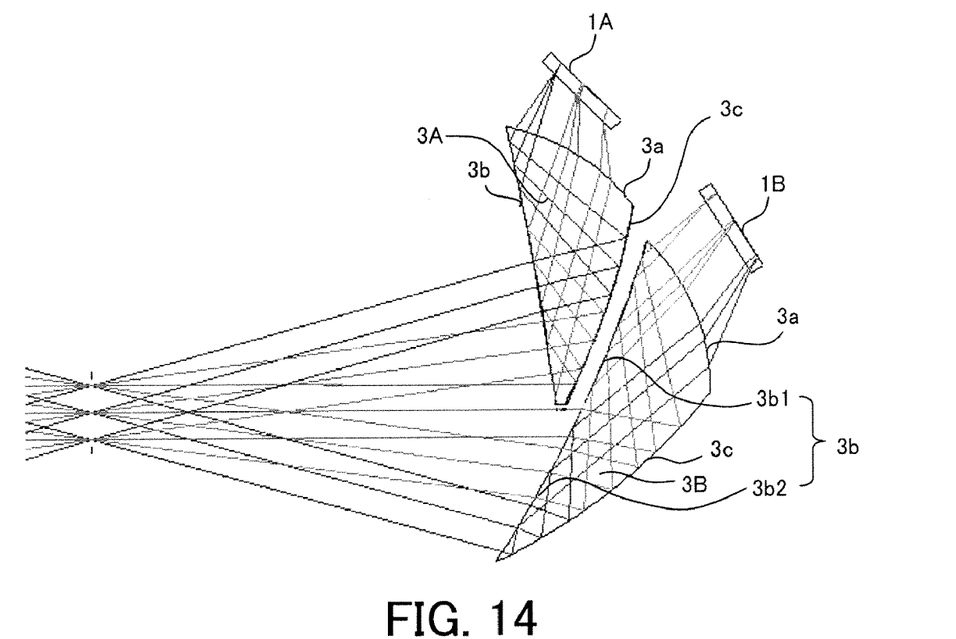
FIG. 14 is a cross sectional view showing a first numeric example of the present invention.

FIG. 14 shows a first numeric example. In this example, 15-degree angles of a 30-degree viewing angle in a direction parallel to the paper of FIG. 14 (in the first cross section direction or in the meridional cross section direction) are allocated to two optical elements 3A and 3B. The diagonal size of the display elements 1A and 1B is ½ inches. Each display element is disposed such that its long side (6.4 mm) extends in a direction perpendicular to the paper of FIG. 14 (in the second cross section direction or in the sagittal cross section direction) and its short side (4.8 mm) extends in a direction parallel to the paper of FIG. 14. The optical elements 3A and 3B are disposed such that partial images displayed on the display elements 1A and 1B are adjacent to each other in their short side direction.

The exit pupil 5 has a diameter of 4 mm, and a distance from the exit pupil 5 to the second surface 3b of the optical element 3A is 27.5 mm. In this example, enlarged virtual images of the partial images displayed on the display elements 1A and 1B can be observed at a distance of 1.4 m from the exit pupil 5.

Part of the third surface 3c of the optical element 3A closely faces part of the second surface 3b of the optical element 3B. A metal-deposited film as a reflective film is formed on an optically effective area in the third surface 3c of each optical element.

An image light flux that has emerged from the display element 1A and then entered the optical element 3A through the first surface 3a thereof is totally reflected by the second surface 3b of the optical element 3A toward the third surface 3c thereof. The image light flux is reflected by the back surface of the third surface 3c (that is, by the reflective film) and then transmitted through part of the second surface 3b to emerge from the optical element 3A toward the exit pupil 5.

Further, an image light flux that has emerged from the display element 1B and then entered the optical element 3B through the first surface 3a thereof is totally reflected by the second surface 3b of the optical element 3B toward the third surface 3c thereof. The image light flux is reflected by the back surface of the third surface 3c (that is, by the reflective film) and then transmitted through the non-overlap area 3b2 other than the overlap area 3b1 in the second surface 3b to emerge from the optical element 3B toward the exit pupil 5.

Figure 15:
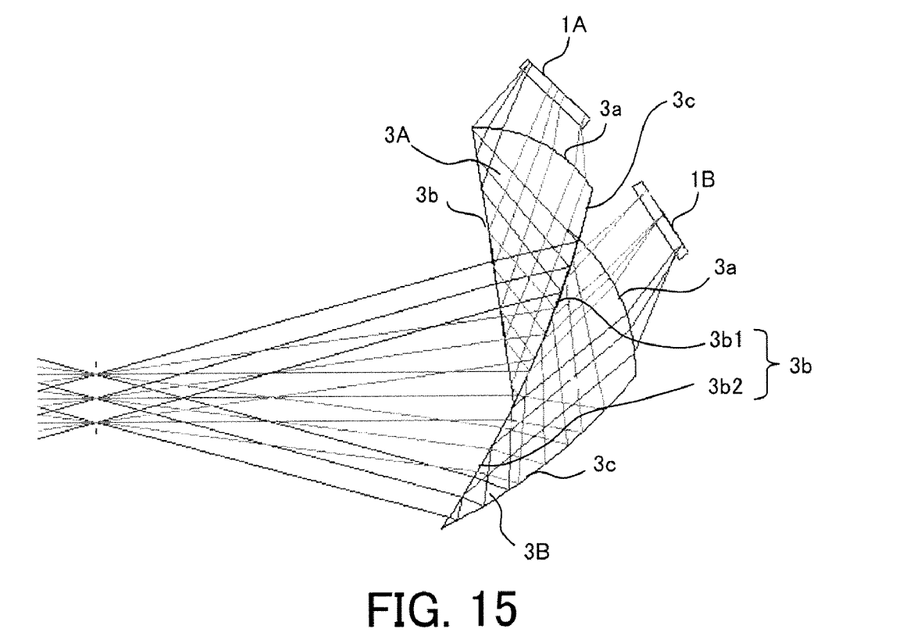
FIG. 15 is a cross sectional view showing a second numeric example of the present invention.

FIG. 15 shows a second numeric example. Also in this example, 15-degree angles of a 30-degree viewing angle in a direction parallel to the paper of FIG. 15 are allocated to two optical elements 3A and 3B. The diagonal size of the display elements 1A and 1B is ½ inches. Each display element is disposed such that its long side (6.4 mm) extends in a direction perpendicular to the paper of FIG. 15 and its short side (4.8 mm) extends in a direction parallel to the paper of FIG. 15. The optical elements 3A and 3B are disposed such that partial images displayed on the display elements 1A and 1B are adjacent to each other in their short side direction.

The exit pupil 5 has a diameter of 4 mm, and a distance from the exit pupil 5 to the second surface 3b of the optical element 3A is 27.5 mm. Also in this example, enlarged virtual images of the partial images displayed on the display elements 1A and 1B can be observed at a distance of 1.4 m from the exit pupil 5.

A metal-deposited film as a reflective film is formed on an optically effective area in the third surface 3c of each optical element. Part of the third surface 3c of the optical element 3A and part of the second surface 3b of the optical element 3B are tightly contacted and joined to each other via the reflective film formed on the third surface 3c of the optical element 3A. The third surface 3c of the optical element 3A and the second surface 3b of the optical element 3B have a continuous curved surface shape.

An image light flux that has emerged from the display element 1A and then entered the optical element 3A through the first surface 3a thereof is totally reflected by the second surface 3b of the optical element 3A toward the third surface 3c thereof. The image light flux is reflected by the back surface of the third surface 3c (that is, by the reflective film) and then transmitted through part of the second surface 3b to emerge from the optical element 3A toward the exit pupil 5.

Further, of an image light flux that has emerged from the display element 1B and then entered the optical element 3B through the first surface 3a thereof, a light flux reaching the overlap area 3b1 in the second surface 3b of the optical element 3B is reflected by the back surface of the overlap area 3b1 (that is, by the reflective film) toward the third surface 3c of the optical element 3B. Further, of the image light flux that has emerged from the display element 1B and then entered the optical element 3B through the first surface 3a thereof, a light flux reaching the non-overlap area 3b2 in the second surface 3b of the optical element 3B is totally reflected by the non-overlap area 3b2 toward the third surface 3c of the optical element 3B. Then, the image light flux reflected by the back surface of the third surface 3c (by the reflective film) is transmitted through the non-overlap area 3b2 in the second surface 3b to emerge from the optical element 3B toward the exit pupil 5.

As described above, each of the embodiments can realize a compact image display apparatus capable of presenting a high-resolution and high-quality image with a wide viewing angle by using plural display elements and plural optical elements corresponding thereto so as to overlap parts of the plural optical elements.

Furthermore, the present invention is not limited to these embodiments and various variations and modifications may be made without departing from the scope of the present invention.

This application claims the benefit of Japanese Patent Application No. 2007-286257, filed on Nov. 2, 2007, which is hereby incorporated by reference herein in its entirety.

What is claimed is:

1. An image display apparatus comprising:
a first display element and a second display element which respectively display a first partial image and a second partial image of a single image, the first and second partial images corresponding to viewing angle areas different from one another; and
a first optical element and a second optical element each of which has a first surface, a second surface, and a third surface, the first and second optical elements respectively allowing light fluxes from the first and second display elements to enter the first and second optical elements through the first surface, and then respectively causing the light fluxes to be reflected by the second and third surfaces to emerge from the first and second optical elements through the second surface toward an exit pupil,
wherein the second surface of the second optical element has an overlap area which faces or contacts the third surface of the first optical element, and
wherein the second optical element causes the light flux from the second display element to emerge toward the exit pupil through a non-overlap area other than the overlap area in the second surface.

2. An image display apparatus according to claim 1,
wherein the overlap area faces the third surface of the first optical element, and
wherein the second optical element causes the light flux reaching the overlap area from the second display element to be totally reflected by the overlap area toward the third surface.

3. An image display apparatus according to claim 2,
wherein the second optical element causes the light flux reaching the non-overlap area from the second display element to be totally reflected by the non-overlap area toward the third surface.

4. An image display apparatus according to claim 1,
wherein the overlap area contacts the third surface of the first optical element via a reflective film disposed therebetween, and
wherein the second optical element causes the light flux reaching the overlap area from the second display element to be reflected by the reflective film toward the third surface.

5. An image display apparatus according to claim 1,
wherein, when a cross section parallel to a direction in which the first and second display elements are arranged is defined as a first cross section, an enlarging magnification of each of the first and second optical elements in the first cross section is lower than an enlarging magnification thereof in a second cross section orthogonal to the first cross section.

6. An image display apparatus according to claim 1,
wherein, when a cross section parallel to a direction in which the first and second display elements are arranged is defined as a first cross section, each of the first and second display elements includes a non-display area which does not display the partial image at least at its end area in a direction of the first cross section.

7. An image display apparatus according to claim 1,
wherein the image display apparatus is mounted on a head of a user, and
wherein the first and second optical elements are arranged in a direction connecting an eye and an ear of the user.

* * * * *